United States Patent [19]

Kang

[11] Patent Number: 4,856,726
[45] Date of Patent: Aug. 15, 1989

[54] TAPE MEASURE

[75] Inventor: Dong M. Kang, Seoul, Rep. of Korea

[73] Assignee: Korea Measures Co., Ltd., Busan, Rep. of Korea

[21] Appl. No.: 137,425

[22] Filed: Dec. 22, 1987

[30] Foreign Application Priority Data

Dec. 23, 1986 [KR] Rep. of Korea ............... 20888/1986

[51] Int. Cl.[4] ..................... B65H 75/48; G01B 3/10
[52] U.S. Cl. .................... 242/84.8; 242/107.3; 33/767
[58] Field of Search ............. 242/84.8, 99, 107.6, 242/107.3, 107.4 R; 33/138

[56] References Cited

U.S. PATENT DOCUMENTS 2,536,766  1/1959  Pechstein .
3,041,004  6/1962  Busch .
3,214,836  11/1965  West .
3,273,820  9/1966  Quenot .................... 242/84.8
3,435,529  4/1969  Quenot .
3,578,259  5/1971  Zelnick .
4,068,383  1/1978  Krebs ................... 242/107.6 X
4,288,923  9/1981  Duda .
4,732,347  3/1988  Stamboulian et al. ........ 242/107.6

Primary Examiner—Stuart S. Levy
Assistant Examiner—Steven M. duBois
Attorney, Agent, or Firm—Seed and Berry

[57] ABSTRACT

A stopper device for tape measures is disclosed which does not make direct contact with the rule, and therefore, it does not cause erasing of the scale marks on the rule. This is achieved by providing a plurality of protrusions at regular intervals around the circumferential flange surfaces of a flanged spool winding case, and also by providing a stopper unit to be selectively engaged with and disengaged from the protrusions.

13 Claims, 3 Drawing Sheets

4,856,726

TAPE MEASURE

TECHNICAL FIELD

The present invention relates to a stopper device for tape measures and other devices with flanged spools.

BACKGROUND OF THE INVENTION

In conventional tape measures, a pressing means was provided at a side of the tape measure body, and the stopping of the rule is carried out by pressing a pressing means directly onto the rule.

Therefore, after a repeated long term use of a tape measure, the contacting top of the pressing means was rubbed off, resulting in the rule failing to stop at the intended position, and slipped off, when the pressing means was pressed. Further, after the stopping of the rule, if the rule is pulled out with a slight force, the rule is easily and continuously slipped out, making it difficult to expect a sure stopping effect.

Another disadvantage of conventional tape measures was that, if the device was repeatedly used, the scale marks on the rule were easily erased due to the frictional contact between the upper face of the rule and the pressing means. Such devices are shown, for example, in U.S. Pat. Nos. 3,578,259; 3,214,836; 3,435,529; 2,536,766; 3,041,044 and 2,288,923.

The coilable rule locking mechanism of U.S. Pat. No. 3,578,259 has a locking mechanism wherein an actuator at the front of the casing can be simply pivoted to actuate a vertically reciprocable lock member which, when moved to Clamping position, securely and reliably holds the tapeline in a particular position of extension from the tape casing. The locking mechanism is operable to clamp the tapeline against a resilient pad.

The coilable rule of U.S. Pat. No. 3,214,836 has a locking mechanism comprising an arcuate slide molded from a suitable flexible, resilient, hardwearing and self-lubricating material such as nylon.

The linear measuring instrument of U.S. Pat. No. 3,435,529 has in a linear measuring instrument casing, a single pivoted lever that locks the tape against an inner wall of the casing.

The locking device for flexible tapes of U.S. Pat. No. 2,536,766 has a locking device for the tape that locks the tape when extended and the measurement is made, thereby preventing any slippage of the tape when the tape is moved to a convenient position for reading and an accurate reading is assured.

As shown in the measuring tape of U.S. Pat. No. 3,04,004, the tape rule is of the type wherein the measuring tape can be withdrawn from the case any selected distance and held there by a brake mechanism. After a measurement is made the tape can be automatically pulled back into the case by means of a spring motor inside the case.

The tape measure of U.S. Pat. No. 4,288,928 has a pivot pin for pivotally mounting a braking lever to the housing for locking the tape in a desired extension position in which a shock absorbing element of a deformable, resilient material is associated with the pivot pin for absorbing shock from the hook member during the return of the tape to its retracted position. The tape measure has a coiled measuring tape adapted to be locked in an extended or unwound position.

As shown in the above-listed U.S. patents, the present invention does not use the structures of the above listed patents and the invention has no features of the above listed patents.

DISCLOSURE OF THE INVENTION

The present invention is intended to give solutions to the disadvantages inherent in conventional tape measures, by arranging that the stopper device so that it does not directly touch the surface of the rule. The stopper device stops the rule indirectly through engagement with the outer circumference of a winding case. In the present invention, because the roll of the rule is accommodated within the winding case, the stopper unit touches only the outer circumference of the winding case without direct contact between the stopper unit and the rule surface, there is no possibility that the scale marks on the rule may be erased, but there is the certainty that the rule will be accurately and surely stopped at the desired position.

The above, and other, objects, features and advantages of the invention, will be apparent in the following detailed description of an illustrative embodiment of the invention which is to be read in connection with the accompanying drawings.

BEST MODE FOR CARRYING OUT THE INVENTION

Figure 1:
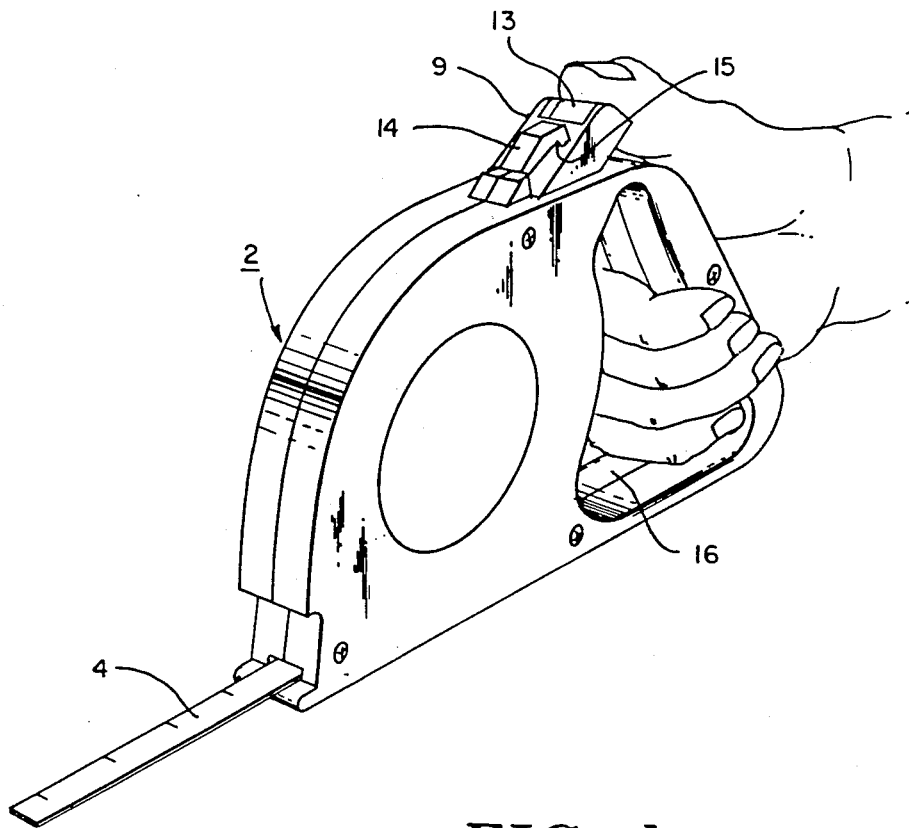
FIG. 1 is a perspective view of the device according to the present invention, in which the use of the device is illustrated.

Now the present invention will be described in more detail according to the preferred embodiment with reference to the attached drawings, so that the object and other advantages of the present invention could be more easily understood. A flanged spool or winding case for the rule is designated by reference No. 1, and this winding case 1 is rotatably installed on a shaft 3 within a tape measure body 2. Protrusions 6, 6a are formed, respectively, at regular intervals around the circumferential outward surface of two spaced apart flange side walls 5, 5a of the winding case 1. Within a central compartment closed by a lid 7 of the winding case 1, there is elastically installed a roll spring 8, the outer tip of this roll spring 8 is connected to the inner tip of a measuring rule 4. The measuring rule 4 is wound about the compartment containing the roll spring 8, between the side walls 5, 5a of the winding case 1.

A stopper unit 9 is installed at the right upper portion of the tape measure body 2 (as viewed in FIG. 2a), and the lower end portion of this stopper unit 9 is shaped so as to mate with the protrusion 6, 6a and the space between the said protrusions 6, 6a. The stopper unit 9 has a pair of windows 10 formed in its opposed side walls, and a supporter 11 protrudes through the windows 10 to support a coil spring 12.

Figure 3:
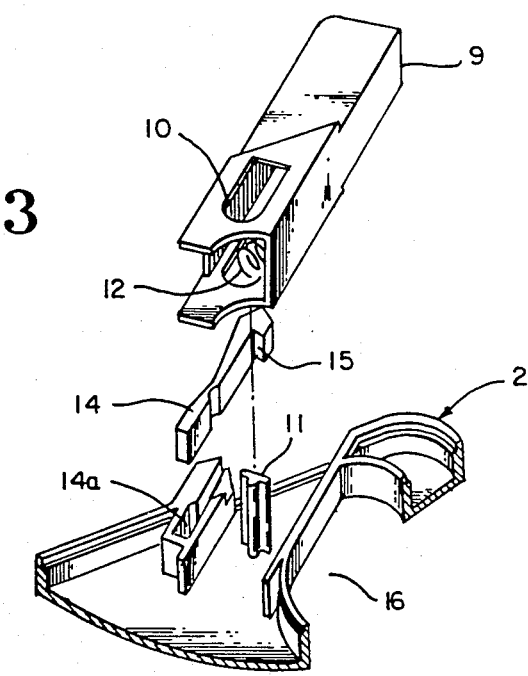
FIG. 3 is an exploded perspective view of the principal parts of the stopper unit according to the prevent invention.
Figure 4:
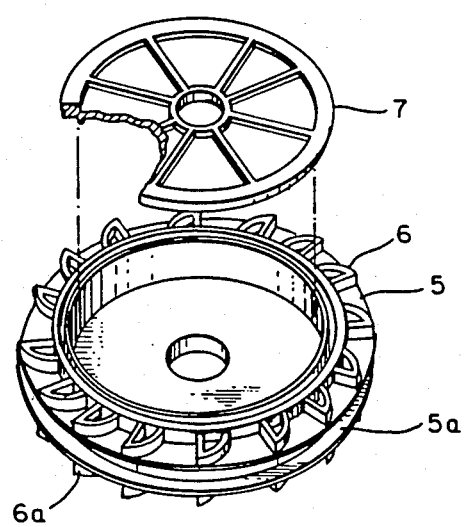
FIG. 4 is an exploded perspective view of the winding case according to the present invention.

The supporter 11 is integrally formed with the tape measure body 2, (see FIG. 3) and the coil spring 12 is elastically installed between the supporter 11 and the upper end of the internal space of the stopper unit 9. The coil spring 12 biases the stopper unit 9 to move out of engagement with the protrusions 6, 6a.

A groove 13 is formed on the upper side wall of the stopper unit 9 for locking of the stopper unit 9, and a shoulder 15 of a locking member 14 can be engaged with the groove 13 to lock the stopper unit 9 in the depressed state with the stopper unit 9 engaging the protrusion 6, 6a.

A handle portion of the tape measure body 2 provides a space 16 to facilitate the grasping of the tape measure body with the hand. The device of the present invention thus constituted will be described below as to its unctions and actuations.

Figure 2A:
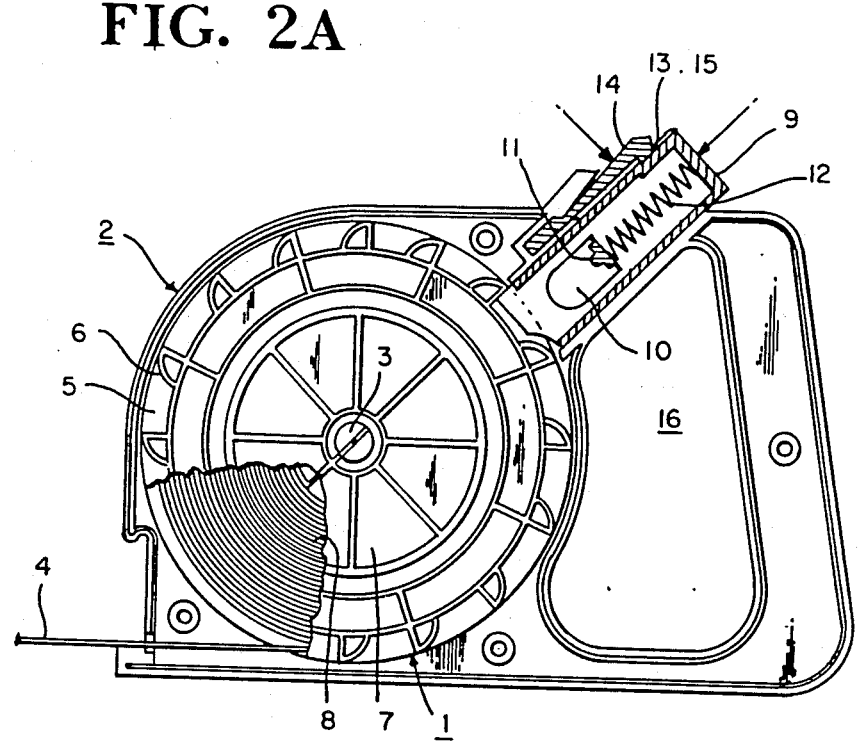
FIG. 2a is a partly cut-out side view of the said device, in which the stopper unit is pressed down to the working position.

When drawing out the rule 4 or winding up the rule, the lower portion of the stopper unit 9 is disengaged from the protrusions 6, 6a which are formed on the circumferential outward surfaces of the side walls 5, 5a of the winding case 1 as shown in FIG. 2a. When the stopper unit 9 is moved up, the winding case 1 will easily revolve, thereby allowing easy drawing-out and winding-up of the rule 4. When a winding-up is carried out, the roll spring 8 which is elastically fixed on the shaft 3 automatically takes up the rule 4, while, when drawing out the rule, it is forcefully pulled out overcoming the resisting force of the roll spring 8. This method of drawing out and winding up is same as that of conventional tape measures.

The different with the present invention is that, after drawing out the rule 4 by as much as the desired length, the rule can be stopped at the desired position with certainty, and even after long term use of the tape measure of the present invention, the scale marks on the surface of the rule will remain intact without any erasing away.

Figure 2B:
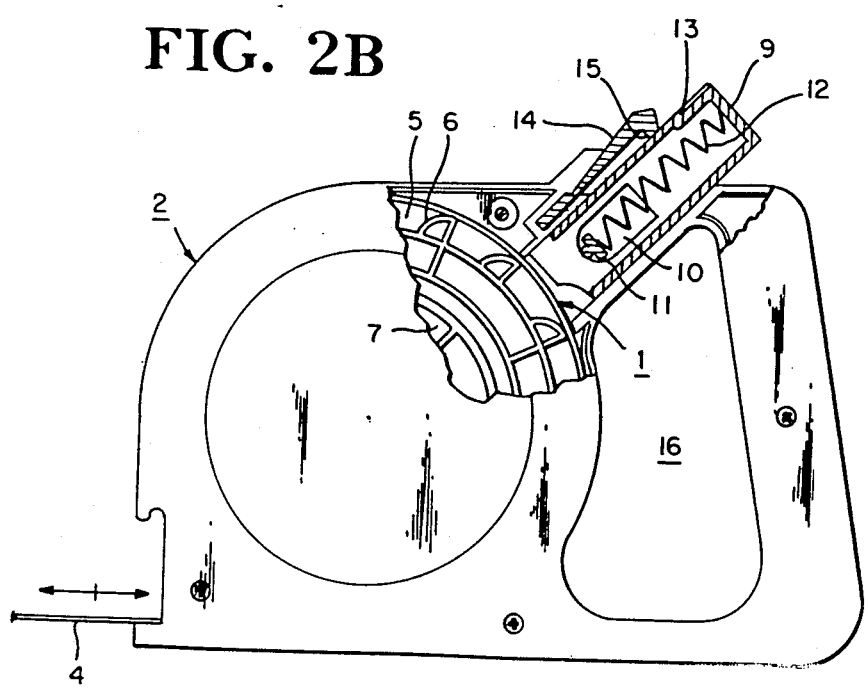
FIG. 2b is a partly cut-out side view of the said device, in which the stopper unit is released upward.

More specifically, in a state such as shown in FIG. 2b, when the rule is drawn or wound up, the braking of the rule 4 can be achieved simply by the following procedure. The four fingers of the user's hand excluding the thumb are inserted into the space 16, and the handle portion is grasped. Then the thumb is brought to the top of the stopper unit 9, and the stopper unit 9 is pushed down. The locking member 14 is self biased forward so that the shoulder 15 of the locking member 14 engages the groove 13 to lock the stopper unit 9 in a depressed position engaging the protrusions 6, 6a of the winding case 1 to prevent rotation of the winding case relative to the tape measure body 2.

In this state, the lower portion of the stopper unit 9 is inserted into the interval between the protrusions 6, 6a which are formed on the circumferential surfaces of the winding case 1 at regular intervals, as shown in FIG. 2a, whereby making the rule 4 absolutely stopped and making it impossible to draw out the rule 4 any further. Thus stopping of the rule 4 or wind up the rule is realized by stopping of the winding case 1 itself, without contacting the rule with the result that repeated long term uses of the tape of the present invention will not cause the erasing of the scale marks on the rule 4. Moreover the stopping of the rule 4 can be achieved accurately and with certainty. Slippage of the rule 4 once locked is not possible.

For releasing the rule 4 from this stopped state, the procedure is simpler. For, in this case, if the thumb is used to press once again slightly against the top of the stopper unit 9, the shoulder 15 of the locking member 14 will be automatically disengaged from the groove 13 due to the elasticity inherent in the locking member 14, and the stopper unit 9 will be automatically released and move up due to the elastic force of the coil spring 12. The above-described releasing of the stopper unit 9 can not lead to the complete escape of the stopper unit from the tape measure body 2, because the stopper unit 9 upward movement is halted by the spring supporter 11 which engages a lower portion of the windows through which it protrudes, as shown in FIG 2(b). The released state of the stopper unit 9 is shown in FIG. 2b.

As described above, the present invention provides a stopper means for the tape measures, the constitution of the device being such that a stopper unit 9 is engaged into an interval between protrusions 6, 6a which are formed at regular intervals around the circumferential surfaces of a winding case 1; this engaged state of the stopper unit 9 is locked by means of a shoulder 15 of a locking member 14 which is engaged into a groove 13 to lock the stopper unit 9; and a coil spring 12 is elastically installed between a spring supporter 11 and the upper end of the internal space of the stopper unit 9, the spring supporter 11 being integrally formed with the tape measure body 2 and passing through the windows 10. The device according to the present invention provides a far greater convenience compared with conventional types, enables accurate and sure stopping of the rule 4, and protects the scale marks from being erased, assuring a long life of the product.

Further the device according to the present invention can be utilized as a rope for a dog, because the length of the rope can be conveniently adjusted. When an owner of a dog goes out of the home, he can adjust the rope to the desired length very conveniently if he uses the device of the present invention.

Further the device of the present invention has a simple structure, its actuation is precise, the device is not likely to malfunction, and its production cost will be low, assuring usefulness and good marketability.

I claim:

1. A tape measure, comprising:
   a housing having an opening to the exterior of said housing;
   a flanged spool rotatably mounted within said housing and having a pair of spaced apart flange sidewalls, said spool including a plurality of circumferentially distributed protrusions attached to one side of at least one of said flange sidewalls with regular intervals between said protrusions;
   a measuring tape coiled about said spool between said flange sidewalls and having a free end portion extending through said housing opening, said spool being rotatable to move said tape between retracted and extended positions;
   lock means for selectively locking said spool against rotation within said housing without directly contacting said tape to selectively prevent extension or retraction of said tape with respect to said housing, said lock means including a spool lock member selectively movable between a first position in which said spool lock member is positioned within one of said intervals between a pair of said protrusions to prevent rotation of said spool and extension or retraction of said tape, and a second position in which said spool lock member is positioned clear of said protrusions to allow rotation of said spool and extension and retraction of said tape, said spool lock member being slidably positioned within an aperture in said housing for movement between said first and second positions, a contact portion of said spool lock member projecting out of said housing and being engageable by a finger or thumb of the tape measure user to selectively cause said spool lock member to slidably move between said first and second positions; said spool lock member having an engagement shoulder; and a catch attached to said housing and having an engagement portion sized to engage and cooperate with said engagement shoulder of said spool lock member when said contact portion of said spool lock member is engaged by a finger or thumb of the tape measure user and thereby slidably moved to position said spool lock member in said first position, said catch engagement portion and engagement should being lockably engageable to hold said spool lock member in said first position to lock said spool against rotation until said catch engagement portion and engagement shoulder are disengaged by the tape measure user to permit slidable movement of said spool lock member into said second position.

2. The tape measure of claim 1 further including spring means positioned within a central compartment of said spool for rotating said spool relative to said housing in a rotational direction to retract said tape after said tape has been extended.

3. The tape measure of claim 2 further including a central shaft attached to said housing and rotatably supporting said spool, and wherein said spring means includes a coil spring having one end portion attached to said central shaft and another end portion attached to said tape.

4. The tape measure of claim 1 wherein the depression of said contact portion of said spool lock member by the tape measure user slidably moves said spool lock member into said first position with said spool lock member positioned within one of said intervals between a pair of said protrusions to prevent rotation of said spool.

5. The tape measure of claim 4 further including biasing means for biasing said spool lock member to slidably move into said second position upon disengagement of said catch engagement portion and engagement shoulder to allow said spool to rotate.

6. The tape measure of claim 5 wherein said biasing means includes a spring mounted within an interior chamber of said spool lock member, said spring having one end portion engaging an interior portion of said spool lock member and another end portion engaging a portion of said housing to bias said spool lock member into said second position.

7. The tape measure of claim 6 wherein said spool lock member has an aperture communicating with said interior chamber, and said housing portion engaged by said spring is a stop member integrally formed as a part of said housing and projecting through said lock member aperture to within said interior chamber for engagement with said spring.

8. The tape measure of claim 1 further including a central shaft attached to said housing and rotatably supporting said spool within said housing.

9. The tape measure of claim 1 further including biasing means for biasing said spool lock member into said second position to allow said spool to rotate.

10. A tape measure, comprising;
a housing having an opening to the exterior of said housing;

a flanged spool rotatably mounted within said housing and having a pair of spaced apart flange sidewalls, said spool including a plurality of circumferentially distributed protrusions attached to one side of at least one of said flange sidewalls with regular intervals between said protrusions;

a measuring tape coiled about said spool between said flange sidewalls and having a free end portion extending through said housing opening, said spool being rotatable to move said tape between retracted and extended positions;

lock means for selectively locking said spool against rotation within said housing without directly contacting said tape to selectively prevent extension or retraction of said tape with respect to said housing, said lock means including a spool lock member selectively movable between a first position in which said spool lock member is positioned within one of said intervals between a pair of said protrusions to prevent rotation of said spool and extension or retraction of said tape, and a second position in which said spool lock member is positioned clear of said protrusions to allow rotation of said spool and extension and retraction of said tape, said spool lock member being slidably positioned within an aperture in said housing for movement between said first and second positions, a contact portion of said spool lock member projecting out of said housing and being engageable by a finger or thumb of the tape measure user to selectively cause said spool lock member to slidably move between said first and second positions, said spool lock member having an engagement shoulder;

a catch attached to said housing and having an engagement portion sized to engage and cooperate with said engagement shoulder of said spool lock member when said contact portion of said spool lock member is engaged by a finger or thumb of the tape measure user and thereby slidably moved to position said spool lock member in said first position, said catch engagement portion and engagement shoulder being lockably engageable to hold said spool lock member in said first position to lock said spool against rotation until said catch engagement portion and engagement shoulder are disengaged by the tape measure user to permit slidable movement of said spool lock member into said second position; and biasing means for biasing said spool lock member into said second position to allow said spool to rotate, said biasing means including a spring mounted within an interior chamber of said spool locking member, said spring having one end portion engaging an interior portion of said spool lock member and another end portion engaging a portion of said housing to bias said spool lock member into said second position.

11. The tape measure of claim 10 wherein said spool lock member has an aperture communicating with said interior chamber, and said housing portion engaged by said spring is a stop member integrally formed as a part of said housing and projecting through said lock member aperture to within said interior chamber for engagement with said spring.

12. A tape measure, comprising:
a housing having an opening to the exterior of said housing;

a flanged spool rotatably mounted within said housing and having a pair of spaced apart flange sidewalls, said spool having a plurality of circumferentially distributed protrusions attached to one side of at least one of said flange sidewalls with regular intervals between said protrusions;

a measuring tape coiled about said spool between said flange sidewalls and having a free end portion extending through said housing opening, said spool being rotatable to move said tape between retracted and extended positions; and a spool lock member positioned within an aperture in said housing and selectively movable between a first position in which said spool lock member is positioned within one of said intervals between a pair of said protrusions to prevent rotation of said spool within said housing and extension or retraction of said tape, and a second position in which said spool lock member is positioned clear of said protrusions to allow rotation of said spool and extension and retraction of said tape, said spool lock member locking said spool against rotation within said housing without directly contacting said tape to selectively prevent extension or retraction of said tape with respect to said housing, said spool lock member having a contact portion projecting out of said housing and engageable by a finger or thumb of the tape measure user to selectively cause said spool lock member to move between said first and second positions, said spool lock member having an engagement shoulder; and a catch attached to said housing and having an engagement portion sized to engage and cooperate with said engagement shoulder of said spool lock member when said contact portion of said spool lock member is engaged by a finger or thumb of the tape measure user and thereby moved to position said spool back member in said first position, said catch engagement portion and engagement shoulder being lockably engageable to hold said spool lock member in said first position to lock said spool against rotation until said catch engagement portion and engagement shoulder are disengaged by the tape measure user to permit movement of said spool lock member into said second position.

13. The tape measure of claim 12 further including biasing means for biasing said spool lock member into said second position to allow said spool to rotate, said biasing means including a spring mounted within an interior chamber of said spool lock member, said spring having one end portion engaging an interior portion of said spool lock member and another end portion engaging a portion of said housing to bias said spool lock member into said second position.

* * * * *

UNITED STATES PATENT AND TRADEMARK OFFICE
CERTIFICATE OF CORRECTION

PATENT NO. : 4,856,726
DATED      : August 15, 1989
INVENTOR(S) : Dong M. Kang

It is certified that error appears in the above-identified patent and that said Letters Patent is hereby corrected as shown below:

In claim 1, column 5, line 16, delete "should" and substitute therefor --shoulder--.

In claim 10, column 6, line 53, delete "locking" and substitute therefor --lock--.

Signed and Sealed this

Twelfth Day of June, 1990

Attest:

HARRY F. MANBECK, JR.

*Attesting Officer*    *Commissioner of Patents and Trademarks*